United States Patent [19]

Kesl et al.

[11] 4,433,531

[45] Feb. 28, 1984

[54] FORAGE HARVESTER CORN SNAPPING HEADER

[75] Inventors: Elmer M. Kesl, Downers Grove; Thomas J. Scarnato, Barrington; Peter Sammarco, Downers Grove, all of Ill.

[73] Assignee: International Harvester Co., Chicago, Ill.

[21] Appl. No.: 64,146

[22] Filed: Aug. 6, 1979

[51] Int. Cl.³ ............................................ A01D 45/02
[52] U.S. Cl. ........................................... 56/106; 56/98; 56/113
[58] Field of Search .................... 56/103–115, 56/98, 119, 14.1, 14.2

[56] References Cited

U.S. PATENT DOCUMENTS

| | | | |
|---|---|---|---|
| 1,906,692 | 5/1933 | Lindgren et al. | 56/104 |
| 1,936,760 | 11/1933 | Hitchcock | 56/103 |
| 2,011,925 | 8/1935 | Benjamin | 56/14.1 |
| 2,180,595 | 11/1939 | Kuhlman | 56/14.2 |
| 2,903,836 | 9/1959 | Sheets | 56/104 |
| 3,075,339 | 1/1963 | Barkstrom | 56/98 |
| 3,187,490 | 6/1965 | Mitchell | 56/119 |
| 3,192,694 | 7/1965 | Slavens | 56/106 |
| 3,589,110 | 6/1971 | Schreiner et al. | 56/106 |
| 3,831,356 | 8/1974 | Maiste et al. | 56/106 |
| 4,084,396 | 4/1978 | Fritz et al. | 56/98 |
| 4,086,749 | 5/1978 | Grewer et al. | 56/98 |
| 4,106,270 | 8/1978 | Weigand et al. | 56/98 |

OTHER PUBLICATIONS

International Harvester Co., Operator's Manual No. 1012996 R1, Rev. 2, 11/74, "Int'l 800 Series Corn Heads", pp. 5, 13.

Primary Examiner—Paul J. Hirsch
Attorney, Agent, or Firm—Dennis K. Sullivan; F. David AuBuchon

[57] ABSTRACT

A corn snapping header for a forage harvester is provided with corn snapping units of the snapping plate type which are disposed with their crop passages converging to a single rear outlet. A single transverse drive line with flexible drive means is provided to drive the snapping units.

4 Claims, 4 Drawing Figures

FORAGE HARVESTER CORN SNAPPING HEADER

CROSS REFERENCE TO RELATED APPLICATION

This application is related to application Ser. No. 64,145, entitled CORN SNAPPING HEADER, filed by Elmer M. Kesl, Peter Sammarco, and Henry H. Quade on Aug. 6, 1979 and assigned to the assignee hereof now U.S. Pat. No. 4,238,916.

BACKGROUND OF THE INVENTION AND THE PRIOR ART

This invention relates to corn snapping headers of the type used primarily in conjunction with forage harvesters for removing the ears from standing plant stalks and feeding them to the forage harvesting chopping mechanism. More particularly, the invention relates to a header in which standard snapping units from a combine corn harvesting header are disposed in a manner eliminating the need for a lateral consolidating means, such as a cross auger.

Forage harvesters are commonly provided with several different headers for different crops, for example, a hay pickup header, a row crop cutoff header, such as shown in Fritz et al U.S. Pat. No. 4,084,396, which harvests the entire plant at the entrance of the crop passage, and a corn snapping header, which harvests only the ears of corn from the stalk. Ideally, each of the headers would be of the same weight and center of gravity location, so that the forage harvester frame should not have to be overdesigned to accommodate a certain unit. However, previous corn snapping headers have been considerably heavier than row crop cutoff headers and have had their centers of gravity further forward because of the necessity to provide a transverse auger with its supporting structure and drive. Thus, not only was the header heavier, more complex and more expensive but the forage harvester also had to be strengthened at additional expense to carry it.

Previous snapping headers for forage harvesters are essentially a two row version of a combine corn header and have included a pair of laterally adjustable corn snapping units, for example, of the type shown in conjunction with a combine header in Schreiner et al U.S. Pat. No. 3,589,110. In these snapping units, the crop passage, which is defined by the snapping plates, is disposed substantially parallel to the line of travel so that the planted stalk may move rearwardly in the crop passage as the machine moves forwardly, and the corn ears removed therefrom while leaving the remainder of the stalk planted in the field. The ears of corn move rearwardly into a cross auger trough and are moved laterally by the cross auger to the center of the headers and then rearwardly into the forage harvester crop inlet. It has been considered necessary with a snapping plate type snapping unit to maintain the crop passage in line with the path of travel. Disposing the crop passage at an angle to the path of travel would produce an unsatisfactory machine because it would break the stalks and uproot the plants thus increasing the amount of trash and the tendency of the corn header to plug up.

In U.S. Pat. No. 1,936,760 to Hitchcock, a corn picker is shown having two separate crop passages normally parallelly disposed to the path of travel and having independent drives and conveying mechanisms. Although normal row spacing is said to be accomplished by the lateral positioning of the snapping units on a transverse pivot shaft, provision is made for pivoting the snapping units about rear pivots, apparently for adjusting to specific field conditions. The snapping units for the Hitchcock machine, which are shown in Lindgren et al U.S. Pat. No. 1,906,692 were of the old open roll type, which, while being less sensitive to row misalignment and trash, produce much larger shelled corn losses than the fixed snapping plate units in use today. The Hitchcock device was apparently never produced commercially.

SUMMARY OF THE INVENTION

The primary object of the invention described herein is to provide a simple, inexpensive, lightweight and efficient corn snapping header of comparable size and weight to a row crop cut off header for a forage harvester.

A more particular object of the invention is to provide a corn snapping header utilizing snapping plate type snapping units wherein the crop passages are disposed at an angle to the path of travel and converge to a single rear outlet aligned with the forage harvester crop inlet.

The above objects of the invention are specifically met in a forage harvester having a crop inlet with transverse infeed rolls disposed therein and a corn snapping header disposed forwardly of the crop inlet and including left and right corn snapping units having crop passages defined by parallel snapping plates, and cooperating counter-rotating snapping rolls being disposed longitudinally adjacent the passage beneath the snapping plates, the transverse spacing of the forward stalk entry ends of the passages being greater than the width of the forage harvester crop inlet. Sheet metal divider structures define a single rear outlet in registry with the forage harvester crop inlet and gathering chains are provided alongside the passages to carry the crop adjacent the forage harvester crop infeed rolls. The snapping units are driven by a single transverse drive line powered by the forage harvester, the drive line being provided with universal joints between the units to accommodate the misalignment of the drives.

The primary advantage of the invention is that it eliminates the use of a lateral consolidating means such as a cross auger, with its attendant supporting structure and drive and thus provides a lightweight unit of comparable weight and center of gravity location to a row crop harvesting unit. Further, the design permits the use of existing snapping units, in slightly modified form, used in a combine corn header which promotes economy of manufacture.

DETAILED DESCRIPTION OF THE DRAWINGS

Other objects and advantages will become apparent upon reading the detailed description of the invention and upon reference to the drawings, in which.

DETAILED DESCRIPTION OF THE PREFERRED EMBODIMENT

Figure 1:
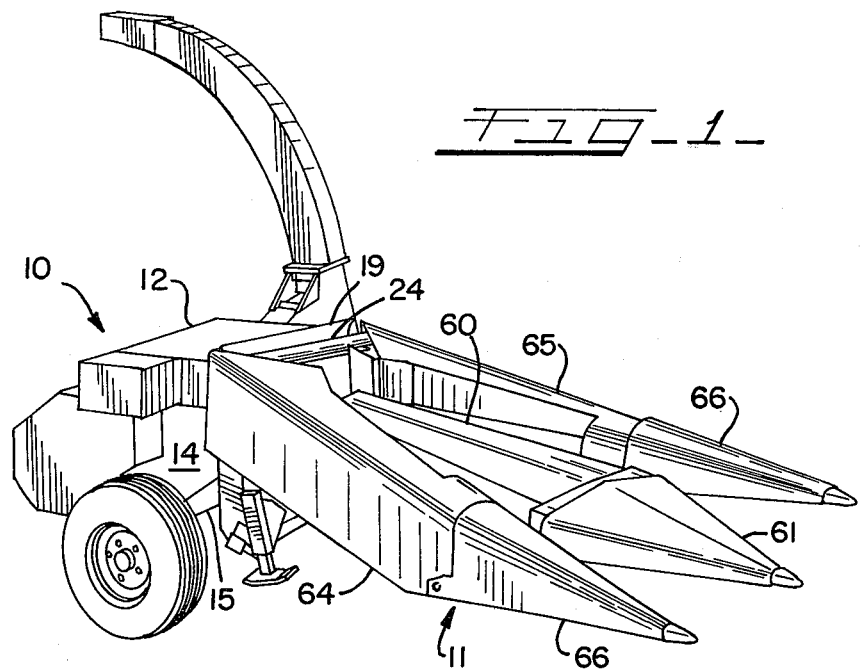
FIG. 1 is a perspective view of a forage harvester snapping header combination embodying our invention.

Turning to the drawings, there is shown in FIG. 1, a forage harvester generally designated 10 provided with a corn snapping header generally 11. The forage harvester 10 is of the type shown (with a hay pickup header) in U.S. Pat. No. 4,133,165 and includes a fore-and-aft extending crop housing 12 including side sheets 14 disposed on the wheel supported forage harvester frame 15 and having a rotary reel cutterhead thereinside for chopping crops against a stationary shear bar in the well known manner. A plurality of transversely extending crop infeed rolls 16 are disposed in the forwardly facing crop inlet 17 of the housing 12, the forwardmost roll preferably extending slightly forwardly thereof as shown in the above referenced patent.

Forwardly of the housing 12, the corn snapping header 11 is mounted to the frame of the forage harvester as by an intermediate yoke 19. The details of the mounting are not important to the present invention except for the alignment of the crop inlet 17 and the snapping header rear outlet. The mounting details may be had by reference to the above-referenced patent and to U.S. Pat. No. 4,067,176.

Figure 3:
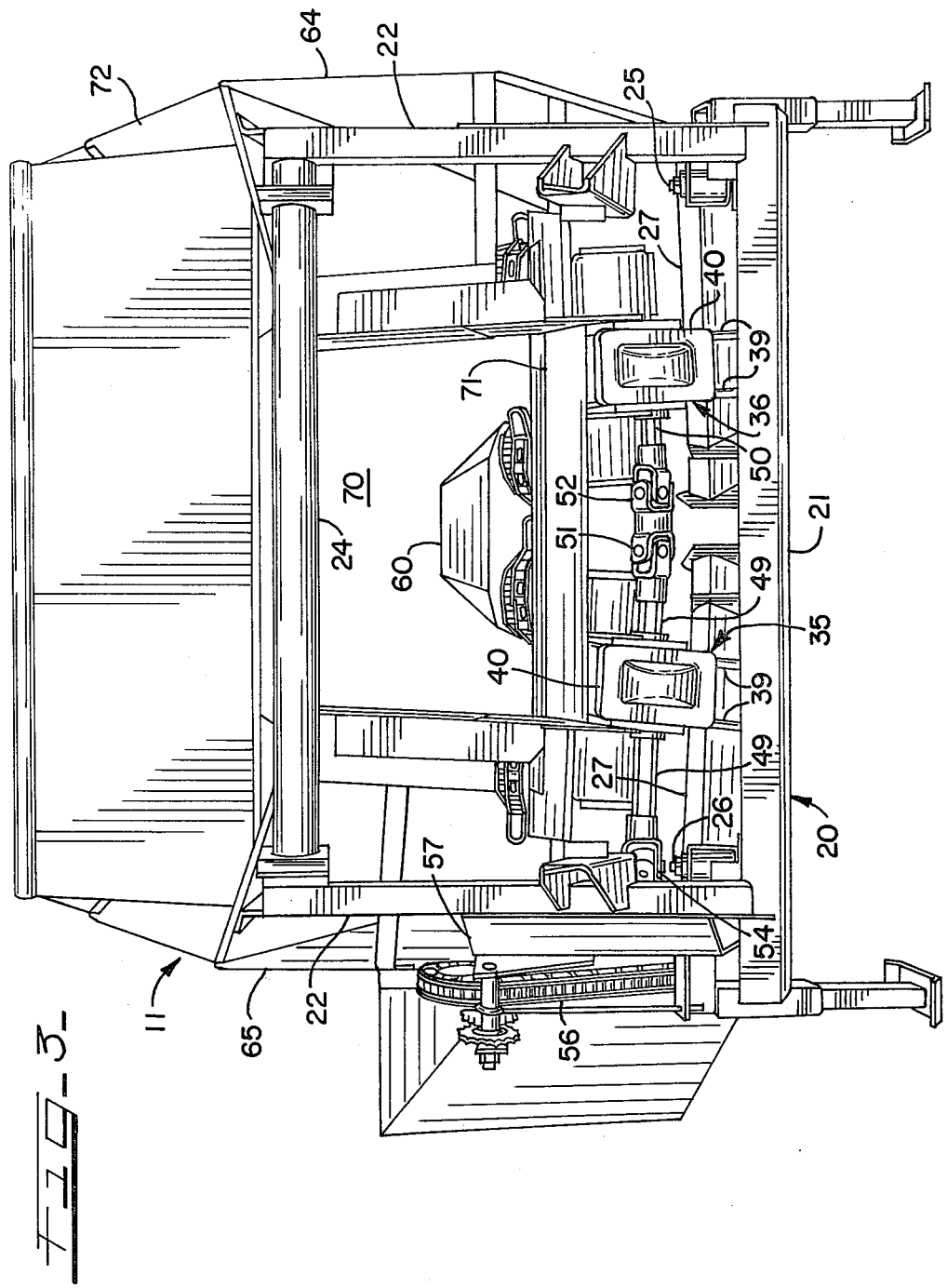
FIG. 3 is a rear view of the snapping header shown in FIG. 2.
Figure 4:
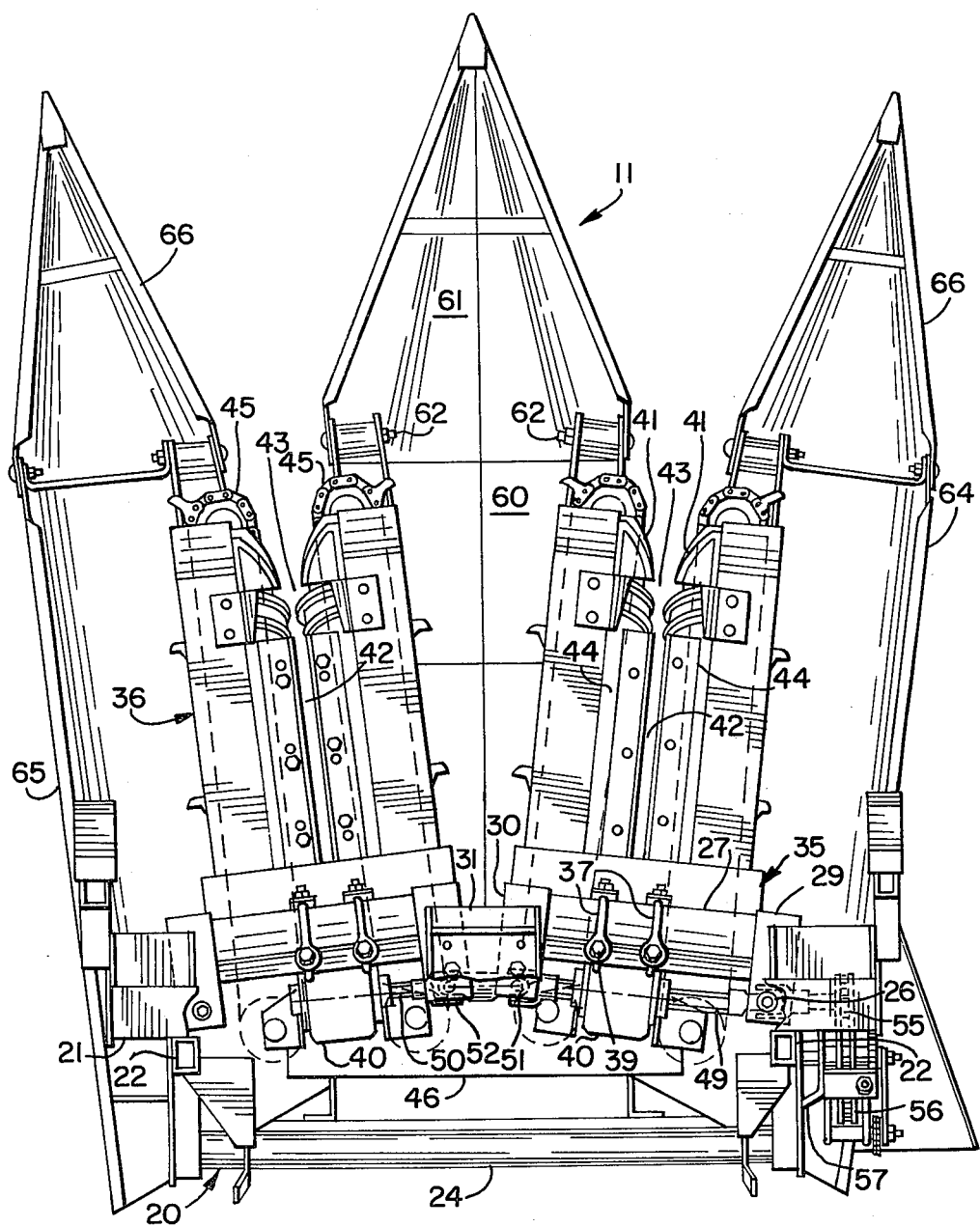
FIG. 4 is a bottom view of the snapping header of FIG. 2.

Turning to FIGS. 3 and 4, the snapping header 11 comprises a transverse main frame assembly 20 including a generally vertical integral retangular framework formed by lower beam 21, upright side beams 22, and the cross bar 24, the latter being carried by the yoke 19 when the snapper header is attached to the forage harvester 11. Pivotally mounted to the lower beam 21 adjacent the outer ends about generally vertical but somewhat forward leaning axes as at 25 and 26 are left and right swingable transverse beam assemblies 27 which are forwardly offset rom the pivots 25, 26 by arms 29. The transverse beam assemblies 27 extend toward the lateral center of the snapping header to inward ends which are provided with suitable rearwardly extending brackets 30 having a plurality of holes for bolt attachment to center bracket 31 attached to the center of lower cross beam 21 with the beams at an obtuse angle to the direction of travel but so that the angle of the beams relative to the frame 20 can be varied to adjust row spacing.

Figure 2:
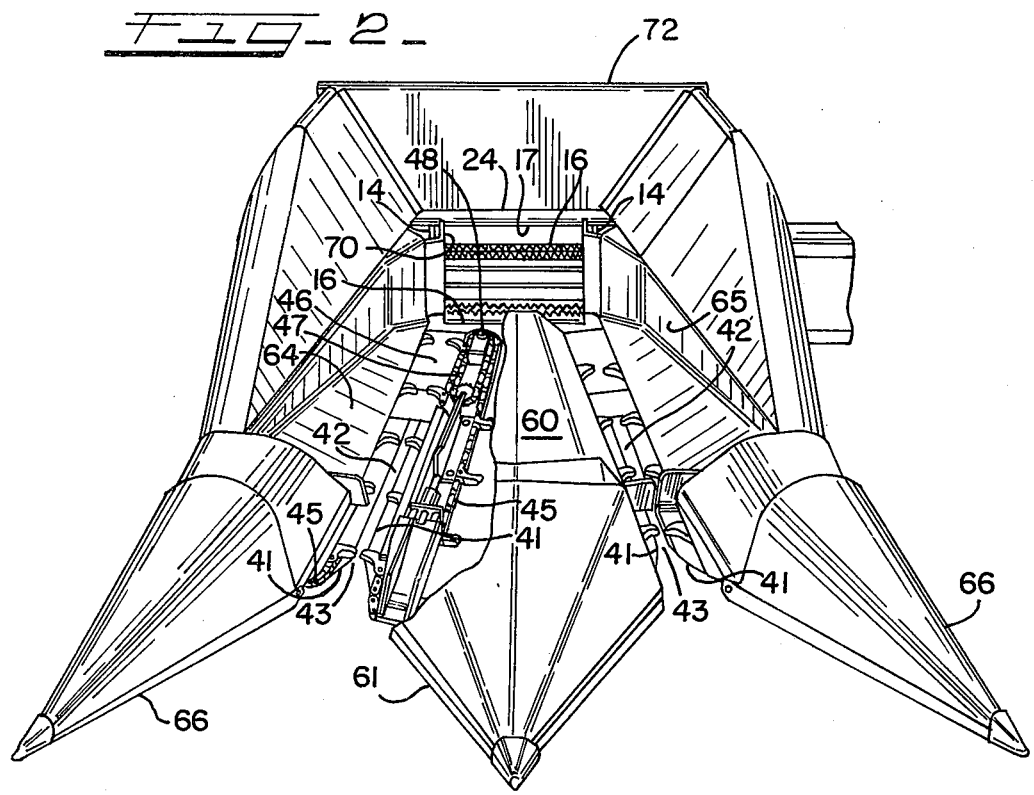
FIG. 2 is an enlarged fron view of the snapping header of FIG. 1, a portion of the sheet metal being removed to expose the underlying parts.

A left and a right corn snapping unit 35, 36 are clamped to the respective transverse beams 27 by eye bolts 37 and bolts 39 which attach to the gear housings 40 of the snapping units 35, 36, the snapping units 35, 36 extending forwardly at a downward angle. Combine corn header snapping units, such as used on the 800 Series Corn Heads manufactured by International Harvester Company except, for a modification in the gathering chain structure as will hereinafter be seen, are preferred. These units are similar to those illustrated in Schreiner et al U.S. Pat. No. 3,589,110 and each comprises the gear housing 40 and framework to which forwardly extending parallel pairs of fixed snapping plates 41 are attached, the snapping plates 41 defining the elongated crop passage 42 having a forward stalk entry end 43 which is perpendicular to the transverse beam 27 as shown in FIG. 4. Disposed below the snapping plates 41 on either side of the crop passage are cooperative counter-rotating snapping rolls 44 which grab the plant stalks and pull them through the snapping plates 41 to remove the ears. Disposed above the snapping plates 41 are lugged gathering chains 45 which run alongside each side of the crop passage 42 from the adjacent forward stalk entry 43 of the passage 42 rearwardly to the area adjacent the forage harvester feed rolls 16 in the crop inlet 17. The stripping units 35, 36 are modified in this regard in that an additional floor sheet 46 is present in the snapping header 11 adjacent the rear outlet and the gathering chains 45 are rearwardly extended thereacross by use of an extra chain 47 and counter-shaft 48 as shown in FIG. 2. The snapping rolls 44 and the gathering chains 45 for each unit derive their drive through the gear boxes 40 which are in turn driven by single drive shafts 49, 50, each of which extend at right angles to the crop passages 42 or parallel to the respective transverse beams 27. The drive shafts 49 and 50 are connected by a flexible shaft means, preferably the two universal joints 51, 52 to form a single drive line which extends leftward to another universal joint 54 located in direct alignment with the pivot 26 of the transverse beam, and continues to a sprocket 55 rotatably mounted on a bracket 57 attached to the left frame member 22 and driven by a chain drive 56 which is in turn connected to the reversible forage harvester drive system by a chain (not shown) in a conventional manner.

A central sheet metal divider structure 60 is attached to the inner sides of the snapping units 35, 36 to cover the area therebetween, the sheet metal being telescoping to accommodate row spacing changes. Similarly telescoping is the forward center divider point 61 which pivots vertically about its attaching points 62 to follow the ground contour. The outer sides of the snapping units 35, 36 are provided respectively with sheet metal outer dividers 64, 65 which extend rearwardly from vertically swingable divider tips 66, the crop passage sides of the dividers 64, 65 extending across the rear of the snapping header 11 to define a single rear outlet 70 beneath the cross bar 24, which is the same width or preferably slightly narrower than the forage harvester crop inlet 17 and is in transverse registry therewith. The floor plate 46 is provided with a hinged extension 71 to prevent corn ears from escaping from the feed rolls 16 which are immediately rearward of the outlet 70. As shown in FIGS. 2 and 4, the outer dividers 64 and 65 may optionally be provided with a sheet metal upper extension 72 for preventing the loss of ears from tall stalks. The corn snapper may also be provided with a beater rotating about a transverse axis forwardly of the rear inlet to push the crops rearwardly. Such beaters are shown, for example, in U.S. Pat. No. 3,192,694. It will be appreciated that due to the adjustment of the transverse beams 27, the transverse spacing of the stalk entries 43 to the crop passages 42 may be varied from the wide spacing, commonly 36"–40", to the narrow crop spacing, commonly 28"–32". In either case, the spacing between the stalk entries of the crop passages is greater than the width of the forage harvester crop inlet.

Thus, there has been provided in accordance with the invention a corn snapping header which fully satisfies the objects and advantages set forth above. In view of the above disclosure, those of skill in the art will recognize that changes and modifications can be made while still practicing our teachings. Accordingly, it is intended to embrace such modifications as fall with the scope of the appended claims.

What is claimed is:

1. A forage harvester having a mobile frame, a crop infeed housing having a crop inlet and a plurality of transversely extending crop infeed rolls thereinside and a corn snapping header for harvesting ears of corn from rows of standing stalks attached to said mobile frame forwardly of said housing inlet, said corn snapping unit comprising a header frame assembly, left and right corn snapping units attached to said header frame assembly and extending downwardly forwardly, each of said snapping units having a crop passage defined by a pair of parallelly disposed snapping plates and including a pair of cooperative counterrotating snapping rolls disposed in longitudinal parallel relationship respectively adjacent said crop passage beneath said snapping plates for pulling standing corn stalks downwardly through said snapping plates to remove the ears therefrom, the transverse spacing between forward stalk entry ends of said crop passages being greater than the width of said forage harvester crop inlet, a central divider structure disposed between the snapping units, left and right outer divider structures attached respectively to the outer sides of said snapping units, said outer divider structures extending rearwardly and partially across the rear of said header to define a single rear outlet having a width equal to or narrower than said forage harvester crop inlet and in transverse registry therewith, said central and outer divider structures defining rearward continuations of said crop passages, and gathering means disposed alongside said crop passages and extending to rear ends adjacent said feed rolls, said snapping unit being characterized in that the snapping unit passages and snapping rolls are disposed at an angle to the path of travel of the forage harvester and converge toward said single rear outlet.

2. The invention in accordance with claim 1 and each of said snapping units having a single drive input along an axis perpendicular to the crop passage, said input axes of said units being out of axial alignment, both of said snapping units being driven by a single transverse drive line, said drive line being provided with a flexible shaft means between said snapping units.

3. Claim 2 and the flexible shaft means comprising at least one universal joint.

4. Claim 2 and the flexible shaft means comprising two universal joints.

* * * * *